US012217273B2

United States Patent
Rezaei et al.

(10) Patent No.: US 12,217,273 B2
(45) Date of Patent: Feb. 4, 2025

(54) DISCOVERING RELEVANT CONCEPT AND CONTEXT FOR CONTENT NODE

(71) Applicant: Netseer, Inc., Santa Clara, CA (US)

(72) Inventors: Behnam Attaran Rezaei, Santa Clara, CA (US); Riccardo Boscolo, Culver City, CA (US); Vwani P. Roychowdhury, Los Angeles, CA (US)

(73) Assignee: Netseer, Inc., Little Rock, AR (US)

( * ) Notice: Subject to any disclaimer, the term of this patent is extended or adjusted under 35 U.S.C. 154(b) by 0 days.

(21) Appl. No.: 17/968,750

(22) Filed: Oct. 18, 2022

(65) Prior Publication Data
US 2023/0043911 A1 Feb. 9, 2023

Related U.S. Application Data

(63) Continuation of application No. 16/545,689, filed on Aug. 20, 2019, now Pat. No. 11,475,465, which is a
(Continued)

(51) Int. Cl.
*G06Q 30/02* (2023.01)
*G06F 16/953* (2019.01)
(Continued)

(52) U.S. Cl.
CPC ........... *G06Q 30/02* (2013.01); *G06F 16/953* (2019.01); *G06F 40/279* (2020.01); *G06Q 10/10* (2013.01); *G06Q 30/0257* (2013.01)

(58) Field of Classification Search
CPC .... G06Q 30/02; G06Q 10/10; G06Q 30/0257; G06F 16/953; G06F 40/279
See application file for complete search history.

(56) References Cited

U.S. PATENT DOCUMENTS 5,721,910 A 2/1998 Unger et al.
6,339,767 B1 1/2002 Rivette et al.
(Continued)

FOREIGN PATENT DOCUMENTS

CN 101278257 A 10/2008
EP 1891509 A2 2/2008
(Continued)

OTHER PUBLICATIONS

University of Chicago, "Behavior of the Museum Visitor", Edward Stevens Robinson (Year: 1928).*
(Continued)

*Primary Examiner* — Breffni Baggot
(74) *Attorney, Agent, or Firm* — ACKnowledge IP, P.C.; Paul Ackerman (57) ABSTRACT

Discovering relevant concepts and context for content nodes to determine a user's intent includes identifying one or more concept candidates in a content node based at least in part on one or more statistical measures, and matching concepts in a concept association map against text in the content node. The concept association map represents concepts, concept metadata, and relationships between the concepts. The one or more concept candidates are ranked to create a ranked one or more concept candidates based at least in part on a measure of relevance. The ranked one or more concept candidates is expanded according to one or more cost functions. The expanded set of concepts is stored in association with the content node.

12 Claims, 5 Drawing Sheets

Related U.S. Application Data continuation of application No. 12/436,748, filed on May 6, 2009, now Pat. No. 10,387,892.

(60) Provisional application No. 61/050,958, filed on May 6, 2008.

(51) Int. Cl.
*G06F 40/279* (2020.01)
*G06Q 10/10* (2023.01)
*G06Q 30/0251* (2023.01)

(56) References Cited

U.S. PATENT DOCUMENTS

| | | | |
|---|---|---|---|
| 6,816,884 B1 | 11/2004 | Summers | |
| 6,826,553 B1 | 11/2004 | DaCosta et al. | |
| 7,092,953 B1 | 8/2006 | Haynes | |
| 7,181,438 B1* | 2/2007 | Szabo | G06Q 30/0212 705/14.27 |
| 7,574,659 B2* | 8/2009 | Szabo | G06Q 30/02 715/962 |
| 7,660,855 B2 | 2/2010 | Arning et al. | |
| 7,680,796 B2 | 3/2010 | Yeh et al. | |
| 7,716,060 B2 | 5/2010 | Germeraad et al. | |
| 7,725,467 B2 | 5/2010 | Yamamoto et al. | |
| 7,725,475 B1 | 5/2010 | Alspector et al. | |
| 7,725,525 B2 | 5/2010 | Work | |
| 7,730,063 B2 | 6/2010 | Eder | |
| 7,818,191 B2 | 10/2010 | Lutnick et al. | |
| 7,822,745 B2 | 10/2010 | Fayyad et al. | |
| 7,885,987 B1 | 2/2011 | Lee | |
| 7,958,120 B2 | 6/2011 | Muntz et al. | |
| 7,984,029 B2 | 7/2011 | Alspector et al. | |
| 7,996,753 B1 | 8/2011 | Chan et al. | |
| 8,010,527 B2* | 8/2011 | Denoue | G06F 16/9535 707/726 |
| 8,024,372 B2 | 9/2011 | Harik et al. | |
| 8,050,965 B2 | 11/2011 | Hellevik et al. | |
| 8,103,659 B1* | 1/2012 | Spiegel | G06F 16/9535 707/758 |
| 8,301,617 B2 | 10/2012 | Muntz et al. | |
| 8,370,362 B2 | 2/2013 | Szabo | |
| 8,380,721 B2* | 2/2013 | Attaran Rezaei | G06F 16/334 707/723 |
| 8,412,575 B2 | 4/2013 | Labio et al. | |
| 8,417,695 B2 | 4/2013 | Zhong et al. | |
| 8,468,118 B2 | 6/2013 | Kim et al. | |
| 8,799,302 B2* | 8/2014 | Singerman | G06F 16/9535 707/706 |
| 8,825,654 B2 | 9/2014 | Muntz et al. | |
| 8,825,657 B2 | 9/2014 | Rezaei et al. | |
| 8,838,605 B2 | 9/2014 | Muntz et al. | |
| 8,843,434 B2 | 9/2014 | Rezaei et al. | |
| 9,378,281 B2* | 6/2016 | Melton | G06F 16/951 |
| 10,423,668 B2* | 9/2019 | Leban | G06F 16/9038 |
| 2001/0037324 A1 | 11/2001 | Agrawal et al. | |
| 2002/0080180 A1 | 6/2002 | Mander et al. | |
| 2002/0091846 A1 | 7/2002 | Garcia-Luna-Aceves et al. | |
| 2002/0143742 A1 | 10/2002 | Nonomura et al. | |
| 2003/0046307 A1 | 3/2003 | Rivette et al. | |
| 2003/0115191 A1* | 6/2003 | Copperman | G06F 16/9038 707/E17.139 |
| 2003/0187881 A1 | 10/2003 | Murata et al. | |
| 2003/0227479 A1 | 12/2003 | Mizrahi et al. | |
| 2004/0059736 A1* | 3/2004 | Willse | G06F 40/20 |
| 2004/0080524 A1 | 4/2004 | Yeh et al. | |
| 2004/0122803 A1 | 6/2004 | Dom et al. | |
| 2004/0133555 A1 | 7/2004 | Toong et al. | |
| 2004/0170328 A1 | 9/2004 | Ladwig et al. | |
| 2004/0267638 A1 | 12/2004 | Giunta | |
| 2005/0010556 A1 | 1/2005 | Phelan | |
| 2005/0033742 A1 | 2/2005 | Kamvar et al. | |
| 2005/0065980 A1 | 3/2005 | Hyatt et al. | |
| 2005/0114198 A1 | 5/2005 | Koningstein et al. | |
| 2005/0114763 A1 | 5/2005 | Nonomura et al. | |
| 2005/0138070 A1 | 6/2005 | Huberman et al. | |
| 2005/0182755 A1 | 8/2005 | Tran | |
| 2005/0210008 A1 | 9/2005 | Tran et al. | |
| 2005/0256905 A1 | 11/2005 | Gruhl et al. | |
| 2005/0256949 A1 | 11/2005 | Gruhl et al. | |
| 2005/0283461 A1 | 12/2005 | Sell et al. | |
| 2006/0004703 A1 | 1/2006 | Spivack et al. | |
| 2006/0036619 A1* | 2/2006 | Fuerst | G16H 50/80 |
| 2006/0041548 A1 | 2/2006 | Parsons et al. | |
| 2006/0080422 A1 | 4/2006 | Huberman et al. | |
| 2006/0106793 A1 | 5/2006 | Liang | |
| 2006/0106847 A1 | 5/2006 | Eckardt et al. | |
| 2006/0112105 A1 | 5/2006 | Adamic et al. | |
| 2006/0112111 A1 | 5/2006 | Tseng et al. | |
| 2006/0171331 A1 | 8/2006 | Previdi et al. | |
| 2006/0184464 A1 | 8/2006 | Tseng et al. | |
| 2006/0209727 A1 | 9/2006 | Jennings et al. | |
| 2006/0212350 A1 | 9/2006 | Ellis et al. | |
| 2006/0218035 A1 | 9/2006 | Park et al. | |
| 2006/0235841 A1 | 10/2006 | Betz et al. | |
| 2006/0271564 A1* | 11/2006 | Meng Muntz | G06Q 10/00 |
| 2007/0038614 A1 | 2/2007 | Guha | |
| 2007/0112597 A1 | 5/2007 | Heckerman et al. | |
| 2007/0136457 A1* | 6/2007 | Dai | G06Q 30/02 709/224 |
| 2007/0143329 A1 | 6/2007 | Vigen | |
| 2007/0239534 A1 | 10/2007 | Liu et al. | |
| 2008/0052152 A1* | 2/2008 | Yufik | G06Q 30/02 705/14.54 |
| 2008/0086592 A1 | 4/2008 | Stephani | |
| 2008/0140491 A1 | 6/2008 | Jain et al. | |
| 2008/0140591 A1* | 6/2008 | Agarwal | G06F 16/951 707/E17.108 |
| 2010/0070448 A1* | 3/2010 | Omoigui | H01L 27/1463 706/55 |
| 2011/0276563 A1 | 11/2011 | Sandoval et al. | |
| 2013/0046797 A1 | 2/2013 | Muntz et al. | |
| 2013/0046842 A1 | 2/2013 | Muntz et al. | |
| 2013/0073546 A1 | 3/2013 | Yan et al. | |
| 2013/0198191 A1 | 8/2013 | Hernández et al. | |
| 2014/0040184 A1 | 2/2014 | Benissan | |
| 2014/0067535 A1 | 3/2014 | Rezaei et al. | |
| 2014/0351237 A1 | 11/2014 | Rezaei et al. | |
| 2015/0262255 A1 | 9/2015 | Khajehnouri et al. | |
| 2023/0043911 A1* | 2/2023 | Rezaei | G06Q 30/0257 |

FOREIGN PATENT DOCUMENTS

| | | |
|---|---|---|
| WO | 2007084616 A2 | 7/2007 |
| WO | 2007084778 A2 | 7/2007 |
| WO | 2006121575 B1 | 12/2007 |
| WO | 2007100923 A3 | 10/2008 |

OTHER PUBLICATIONS

Wiley Encyclopedia of Computer Science and Engineering (Year: 2009).*

Jeffrey Heer's Prefuse: A toolkit for Interactive Information Visualization (2005) ACM Human Factors in Computing Systems (CHI), 421-430 (Year: 2005).*

Weikum et al., "Towards Self-Organizing Query Routing and Processing for Peer-to-Peer Web Search", DELIS-TR-0287, 2005, 19 pages.

Zou et al., "Email Virus Propagation Modeling and Analysis", Univ. of Mass., Dept. of Electrical and computer Engineering, Dept. of Computer Science, 2004, TR-CSE-03-04, pp. 1-17.

Underhill, Why We Buys, 1999.

Wang, G., "Web Search with Personalization and Knowledge", 2002 Proceedings of the IEEE Fourth International Symposium on Multimedia Software Engineering, 2002.

Amendment and Response to Office Action in U.S. Appl. No. 12/130,171, filed Aug. 1, 2011.

Amendment and Response to Office Action in U.S. Appl. No. 11/624,674, mailed Oct. 21, 2011.

Amendment and Response to Office Action in U.S. Appl. No. 11/625,279, filed Aug. 12, 2013.

(56) References Cited

OTHER PUBLICATIONS

Amendment and Response to Office Action in U.S. Appl. No. 11/625,279, filed Jan. 3, 2014.
Amendment and Response to Office Action in U.S. Appl. No. 11/625,279, filed Mar. 16, 2012.
Amendment and Response to Office Action in U.S. Appl. No. 11/625,279, filed Oct. 17, 2012.
Amendment and Response to Office Action in U.S. Appl. No. 11/680,599, filed Aug. 23, 2010.
Amendment and Response to Office Action in U.S. Appl. No. 11/680,599, filed Aug. 3, 2011.
Amendment and Response to Office Action in U.S. Appl. No. 11/680,599, filed Feb. 29, 2012.
Amendment and Response to Office Action in U.S. Appl. No. 11/680,599, filed Oct. 29, 2009.
Amendment and Response to Office Action in U.S. Appl. No. 11/680,599, filed Oct. 30, 2012.
Amendment and Response to Office Action in U.S. Appl. No. 11/923,546, filed Nov. 6, 2013.
Amendment and Response to Office Action in U.S. Appl. No. 12/130,171, filed Apr. 19, 2012.
Amendment and Response to Office Action in U.S. Appl. No. 13/660,940, filed Apr. 7, 2014.
Amendment and Response to Office Action in U.S. Appl. No. 13/660,955, filed Apr. 7, 2014.
Calado, P., et al., "Combining Link-Based and Content-Based Methods for Web Document Classifications," CIKM'03, pp. 394-401, ACM, 2003.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Franceschetti et. al., "Closing the Gap in the Capacity of Wireless Networks Via Percolation Theory," IEEE Trans. On Information Theory, vol. 53, No. 3, Mar. 2007, pp. 1009-1018.
Jiang, et al., "Monotone Percolation and the Topology Control of Wireless Networks", California Institute of Technology, Electrical Engineering Dept, 0-7803-8968-9/05, 2005, pp. 327-338.
Kini et. al., "Fast and efficient randomized flooding on lattice sensor networks", Nov. 19, 2004, Drexel University, pp. 1-33.
Kong et al., "Collaborative Spam Filtering Using E-Mail Networks", Aug. 2006, IEEE, pp. 67-73.
Newman, M.E.J. et al., "Scaling and percolation in the small-world network model", Sante Fe Institute, May 6, 1999, pp. 1-12.
Newman, M.E.J., "Random Graphs as Models of Networks", SFI Working Paper: 2002-02-005, 2002, pp. 1-36.
Notice of Allowance in U.S. Appl. No. 11/624,674, mailed Oct. 12, 2012.
Notice of Allowance in U.S. Appl. No. 11/625,279, mailed Apr. 16, 2014.
Notice of Allowance in U.S. Appl. No. 11/680,599, mailed Apr. 30, 2014.
Notice of Allowance in U.S. Appl. No. 13/098,870, mailed Jun. 28, 2012.
Notice of Allowance in U.S. Appl. No. 13/660,940, mailed Jun. 13, 2014.
Notice of Allowance in U.S. Appl. No. 14/457,693, mailed May 12, 2016.
Notice of Allowance in U.S. Appl. No. 13/660,955, mailed Jun. 16, 2014.
Office Action in U.S. Appl. No. 11/624,674, mailed Dec. 20, 2011.
Office Action in U.S. Appl. No. 11/625,279, mailed Apr. 17, 2012.
Office Action in U.S. Appl. No. 11/625,279, mailed Feb. 12, 2013.
Office Action in U.S. Appl. No. 11/625,279, mailed Oct. 3, 2013.
Office Action in U.S. Appl. No. 11/625,279, mailed Sep. 16, 2011.
Office Action in U.S. Appl. No. 11/680,599, mailed Apr. 30, 2012.
Office Action in U.S. Appl. No. 11/680,599, mailed Aug. 29, 2011.
Office Action in U.S. Appl. No. 11/680,599, mailed Jul. 3, 2013.
Office Action in U.S. Appl. No. 11/923,546, mailed Aug. 14, 2014.
Office Action in U.S. Appl. No. 11/923,546, mailed Jan. 25, 2016.
Office Action in U.S. Appl. No. 11/923,546, mailed Jun. 6, 2013.
Office Action in U.S. Appl. No. 11/923,546, mailed Jun. 9, 2015.
Office Action in U.S. Appl. No. 12/130,171, mailed Oct. 19, 2011.
Office Action in U.S. Appl. No. 13/660,940, mailed Jan. 6, 2014.
Office Action in U.S. Appl. No. 14/457,693, mailed Jan. 21, 2016.
Office Action in U.S. Appl. No. 13/660,955, mailed Jan. 8, 2014.
Page, L. et al., "The Page Rank Citation Ranking: Bringing Order to the Web," Technical Report, Stanford InfoLab, 1998, pp. 1-17.
Silverberg et al., "A Percolation Model of Innovation in Comples Technology Spaces", Sep. 2002, MERIT—Infornomics Research Memorandum Series, pp. 1-24, Sep. 2002.
Office Action in U.S. Appl. No. 11/923,546, mailed Aug. 27, 2012.

* cited by examiner

FIG. 1

Candidate concept extractor

Seed nodes and normalized score:

- Alzheimer's disease, score= 1.0
- diabetes, score= 0.937376
- insulin, score= 0.8725628
- Alzheimer, score= 0.45225
- Swedish study, score= 0.44467
- normal brain function, score= 0.34265
- brain, score= 0.2345652
- study, score= 0.1870422
- people with diabetes, 0.156367
- Sweden's Uppsala University, score= 0.11211
- 31% more likely, score= 0.0389327
- pieces of the puzzle, score= 0.0001111

DISCOVERING RELEVANT CONCEPT AND CONTEXT FOR CONTENT NODE

FIELD OF THE INVENTION

The present invention relates to the field of computer science. More particularly, the present invention relates to discovering relevant concepts and context for content nodes to determine a user's intent, and using this information to provide targeted advertisement and content.

BACKGROUND

Information retrieval systems are typically designed to retrieve relevant content from a data repository, based on inputs from users. The user input can be in any of the following example forms: (i) a set of keywords, (ii) single or multiple lists of URLs and domains, and (iii) a set of documents (e.g., text files, HTML pages, or other types of markup language content). A goal of such information retrieval systems is to pull the most relevant content (i.e., most relevant to the given input) from the underlying repository, which might itself consist of a heterogeneous set of structured and unstructured content. An example of the aforementioned information retrieval system is a traditional search engine, where a user provides a set of keywords, and the search engine provides simple ranked lists of top relevant web pages, and a separate list of top relevant paid listings or sponsored links. The set of web pages matching user's search queries and the advertisement database containing sponsored advertising materials are currently two separate databases that are processed very differently to pull the relevant pages and the sponsored links for the same user query. Thus, the conventional search engine described above provides an example of two distinct information repositories being processed in response to the same query.

Current systems find important keywords of a web page then try to expand them using various resources. This expanded set of keywords is compared with a user-provided set of keywords. One problem with such an approach is that keywords can have different meanings. For example, "Chihuahua" is a dog breed, but it is also a province in Mexico. In current systems, Chihuahua may expand to:

Chihuahua Breeders,
Travel to Chihuahua
Travel to Mexico
Chihuahua Puppy
Dog Training
Hotels in Chihuahua
Teacup Chihuahua Puppies
Cheap flights,
. . .

A person interested in a Chihuahua dog would find information about the Chihuahua province or travel to it less useful. And a person interested in the Chihuahua province would find information about dog training or a Chihuahua dog less useful. Without knowing the context of the user-provided set of keywords, current systems often present search results that are irrelevant to what the user is seeking.

While the aforementioned systems allow for limited targeting of advertisement and content, such systems fail to provide efficient targeted advertisement avenues. Accordingly, a need exists for an improved solution for advertisement targeting.

SUMMARY

The content in a content node is expanded into groupings of concepts and phrases, where each such group represents one possible user intention (as implied by the query phrase or keyword). Each such grouping is analyzed to provide relevant content, such as unstructured data like World Wide Web data, categorized data, display advertisements, and paid listings. This more accurately reflects user intentions even for cases where click through information is absent.

A computerized system for finding important keywords on a content node uses its content and other related URLs like domains. The system is capable of clustering and pruning them by projecting such keywords and phrases on a predefined conceptual map. The projection on the conceptual map enables the expansion of the user intention into multiple contexts, and the further identification of content relevant to the original content node.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of discovering relevant concepts and context for content nodes to determine a user's intent, and using this information to provide targeted advertisement and content. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

The invention examines content of interest to a user, to determine what concepts are most closely associated with that content. Other content that is closely associated with the same concepts taken in context is more likely be of interest to the user. And other content that has similar words but different concepts is less likely be of interest to the user. The invention uses concept information previously gleaned from an analysis of other web pages to better understand the context of a current web page. Concepts extracted from the current web page that are not related to the current context are pruned. The content known to be of interest to the user may be presented along with other content that is closely associated with the concepts related to the current context, thus increasing the likelihood that the user will find the other content interesting.

For example, suppose a user visits a web page describing the "Chihuahua" province of Mexico. The "Chihuahua" may expand to:

Chihuahua Breeders,
Travel to Chihuahua
Travel to Mexico
Chihuahua Puppy
Dog Training
Hotels in Chihuahua
Teacup Chihuahua Puppies
Cheap flights But the current context relates to the "Chihuahua" province, not the Chihuahua dog breed. According to the invention, concepts extracted from the current web page that are not related to the current context are pruned, resulting in only concepts related to the current context: Travel to Chihuahua Travel to Mexico Hotels in Chihuahua Cheap flights The current web page may be presented along with other content (e.g. paid listings or other websites) that is closely associated with these four concepts that are related to the current context, thus increasing the likelihood that the user will find the other content interesting.

In the context of the present invention, the term "content node" refers to one or more groupings of data. Example groupings of data include a web page, a paid listing, a search query, and a text file.

In the context of the present invention, the term "concept" refers to a unit of thought, expressed by a term, letter, or symbol. It may be the mental representation of beings or things, qualities, actions, locations, situations, or relations. A concept may also arise from a combination of other concepts. Example concepts include "diabetes," "heart disease," "socialism," and "global warming."

In the context of the present invention, the term "concept association map" refers to a representation of concepts, concept metadata, and relationships between the concepts.

Figure 1:
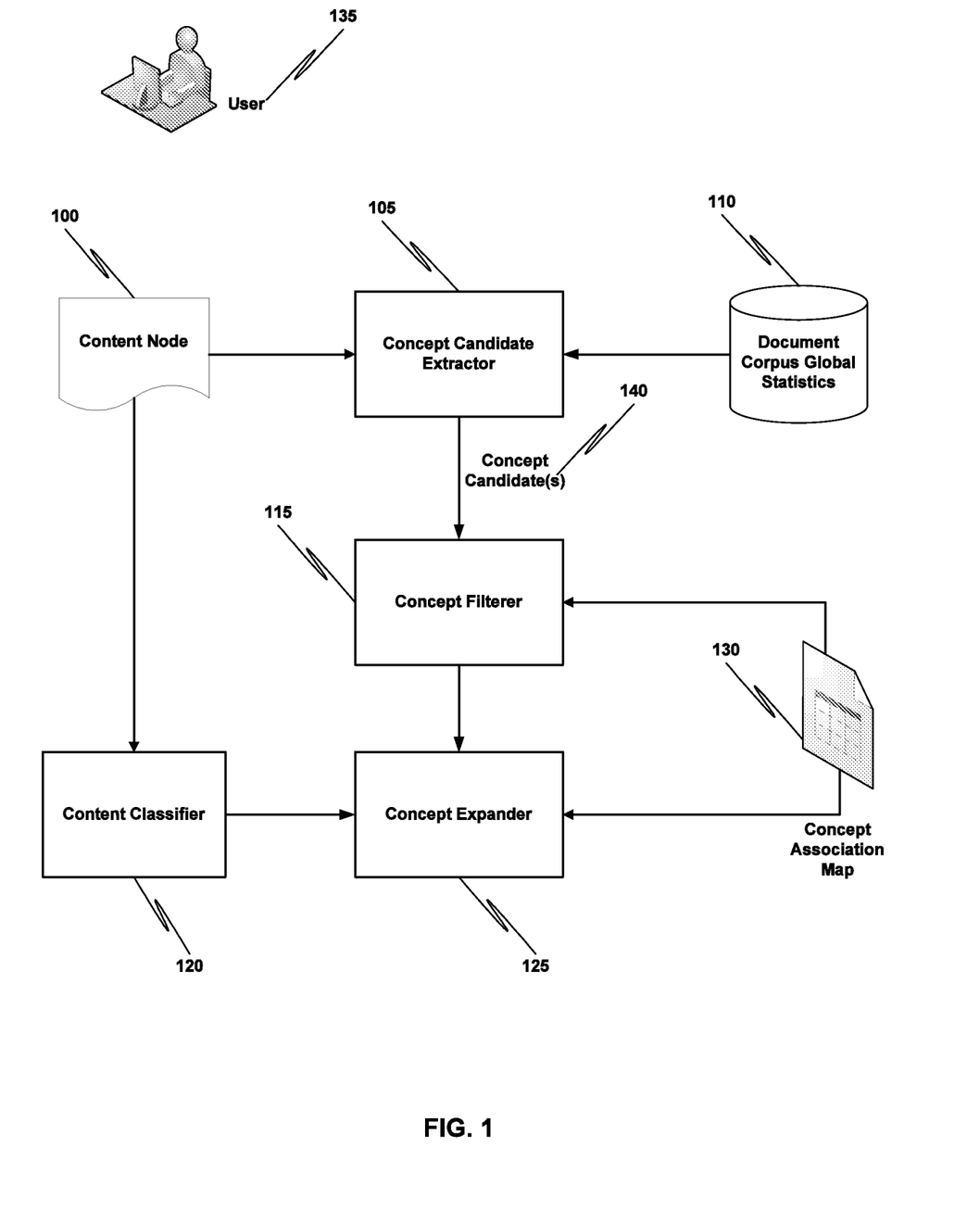
FIG. 1 is a block diagram that illustrates of a system for discovering relevant concepts and context for content nodes in accordance with one embodiment of the present invention.

FIG. 1 is a block diagram that illustrates a system for discovering relevant concepts and context for content nodes in accordance with one embodiment of the present invention. As shown in FIG. 1, concept association map 130 includes concepts and their relationships, which may be expressed as bi-directional edges. Concepts are nodes in a graph, and different kinds of meta-data are associated with each such node. For example, the node meta-data can include the frequency of appearance of the concept in a given corpus, its structural relevance in the graph, cost per action (CPA) and click through rate (CTR) data for ads associated with it, CTR data for the concept itself as derived from user 135 browsing patterns, as well as a labeling that associates it with a specific category. Unlike static concept databases, this concept association map 130 is dynamic and it is continuously updated by the system.

According to one embodiment of the present invention, the concept association map 130 is derived from different sources. Example sources include concept relationships found on the World Wide Web, associations derived from users 135 browsing history, advertisers bidding campaigns, taxonomies, and encyclopedias.

Still referring to FIG. 1, concept candidate extractor 105 is configured to identify one or more relevant concept candidates in a content node 100. Concept candidate extractor 105 relies at least in part on a set of statistical measures (document corpus global statistics 110) in order to identify such candidates. According to one embodiment of the present invention, one or more of the following statistical measures 110 are used to extract concept candidates:

a. Global document frequency of n-grams defining a concept. This measure is indicative of the likelihood that a given n-gram will appear in a document that is part of a corpus.
b. Frequency of n-grams in the content node 100.
c. Similarity of the content node 100 to other content nodes for which relevant concept candidates have already been identified.
d. Weight of the node in the concept graph.

According to one embodiment of the present invention, concept candidates 140 are extracted from different input sources associated with a page on the World Wide Web, viz. the body of the HTML page, the title, the meta-data tags, the anchor text of hyperlinks pointing to this page, the anchor text of hyperlinks contained in the page, the publishing history of the page, as well as the same type of input sources for pages related to this one.

According to one embodiment of the present invention, the content to be tagged with concepts is provided directly by the user 135, for example in the form of a text file.

According to one embodiment of the present invention, the content to be tagged is any textual section of a relational database, e.g. a product inventory database.

According to another embodiment of the present invention, the node content is a user query, defined as a set of search keywords.

According to another embodiment of the present invention, the concept candidates 140 are provided by the user 135 as input to the system. For example, in a bidding campaign a content provider or a merchant could provide such a list based on internal knowledge about the products to be advertised.

According to one embodiment of the present invention, for web page, top referral queries on major search engines are also identified as top concepts. For example, if for a URL a.b.com/d, most of the incoming traffic from major search engines is coming from users 135 searching for query "diabetes" and "diabetes symptoms," these queries are added as top concepts.

According to another embodiment of the present invention, concepts can also get identified from other pages relevant to the page of interest, for example if the relevant page is structurally similar (through hyperlinks) to the page of interest, or if the relevant page is contextually similar (same content) to the page of interest.

Concept candidate extractor 105 is configured to use the aforementioned statistics to extract suitable concept candidates in the content node 100. This is accomplished by matching the concepts available in the concept association map 130 against the text in the content node 100.

Concept filterer 115 is configured to rank the concept candidates 140 based at least in part on a measure of relevance that weighs their frequency in the content node 100, their likelihood of appearing in a document, as well as the likelihood of being selected based on the closeness of this content node 100 to similar concept nodes.

According to another embodiment of the present invention, for the case of structured content (e.g. a web page), different content sections are weighed according to their relative importance. For example, the title of a page is weighted more than the body of the page, relative to its length.

Figure 2:
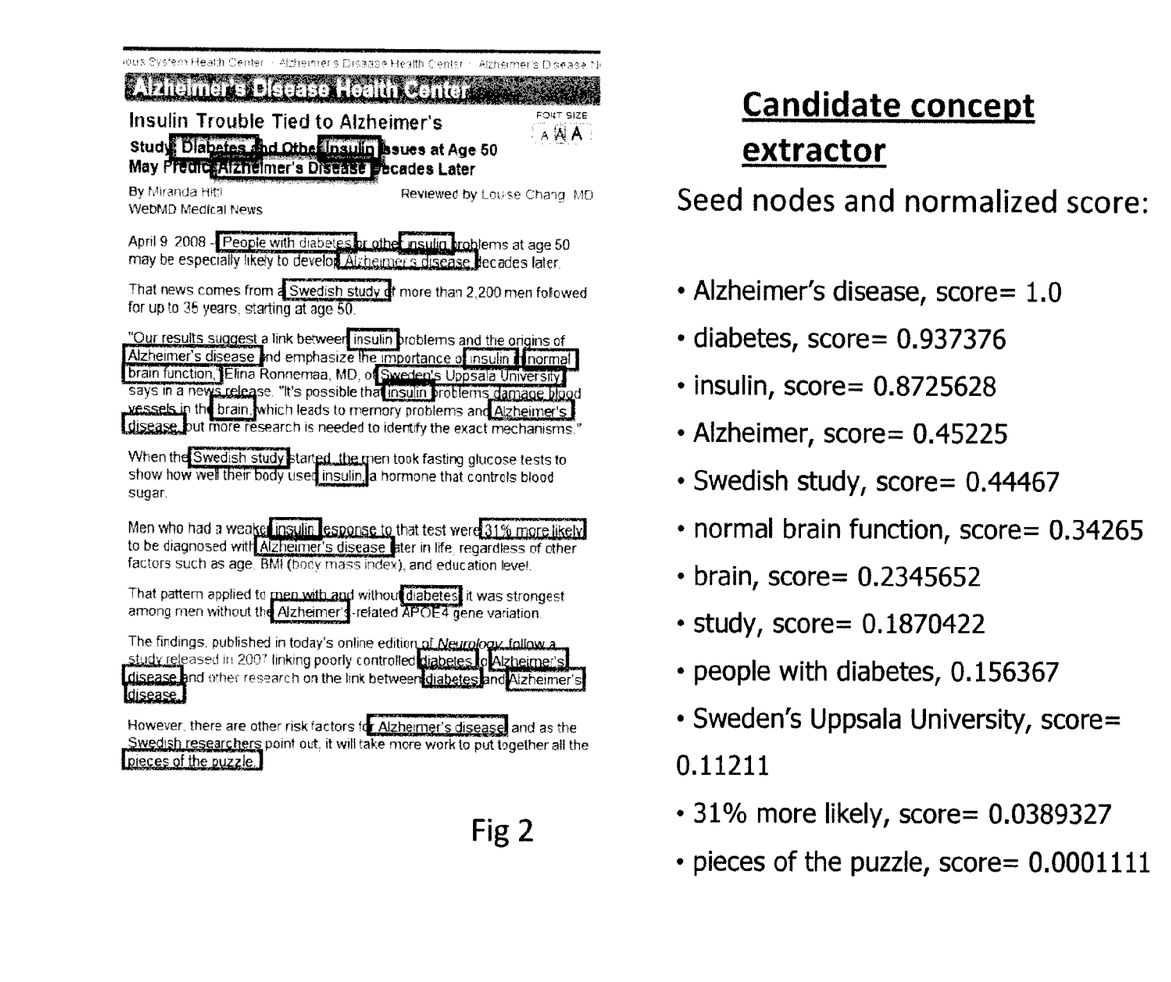
FIG. 2 is a block diagram that illustrates extracting candidate seed concepts from a document in accordance with one embodiment of the present invention.

FIG. 2 is a block diagram that illustrates extracting candidate seed concepts from a document in accordance with one embodiment of the present invention. As shown in FIG. 2, node content is: [type=web page, url=http://www.webmd.com/alzheimers/news/20080409/insulin-trouble-tied-to--alzheimers]

The concept candidates selected and their respective scores are, ranked in order of decreasing relevance:
[insulin, score=1.0]
[diabetes, score=1.0]
[people with diabetes, score=0.873529]
[Swedish study, score=0.123344]
[Alzheimer's disease, score=0.3456]
[study, score=0.43222]
[brain, score=0.986292]
[normal brain function, score=0.563738]
[more research is needed, score=0.23445]
[Sweden's Uppsala University, score=0.432122]
[released in 2007, score=0.13456]
[31% more likely to be diagnosed, score=0.11111]
[pieces of the puzzle, score=0.0045466]

The mapping of the candidates against the available conceptual map shows that the following concept candidates are associated with high score relative to other concept candidates:
[diabetes, people with diabetes, Alzheimer's disease, brain, normal brain function, insulin].

Referring again to FIG. 1, concept expander 125 is configured to expand the initial set of seed concepts by selecting neighbors of such seed nodes, according to a set of cost functions. This is described in more detail below, with reference to FIG. 3.

Figure 3:
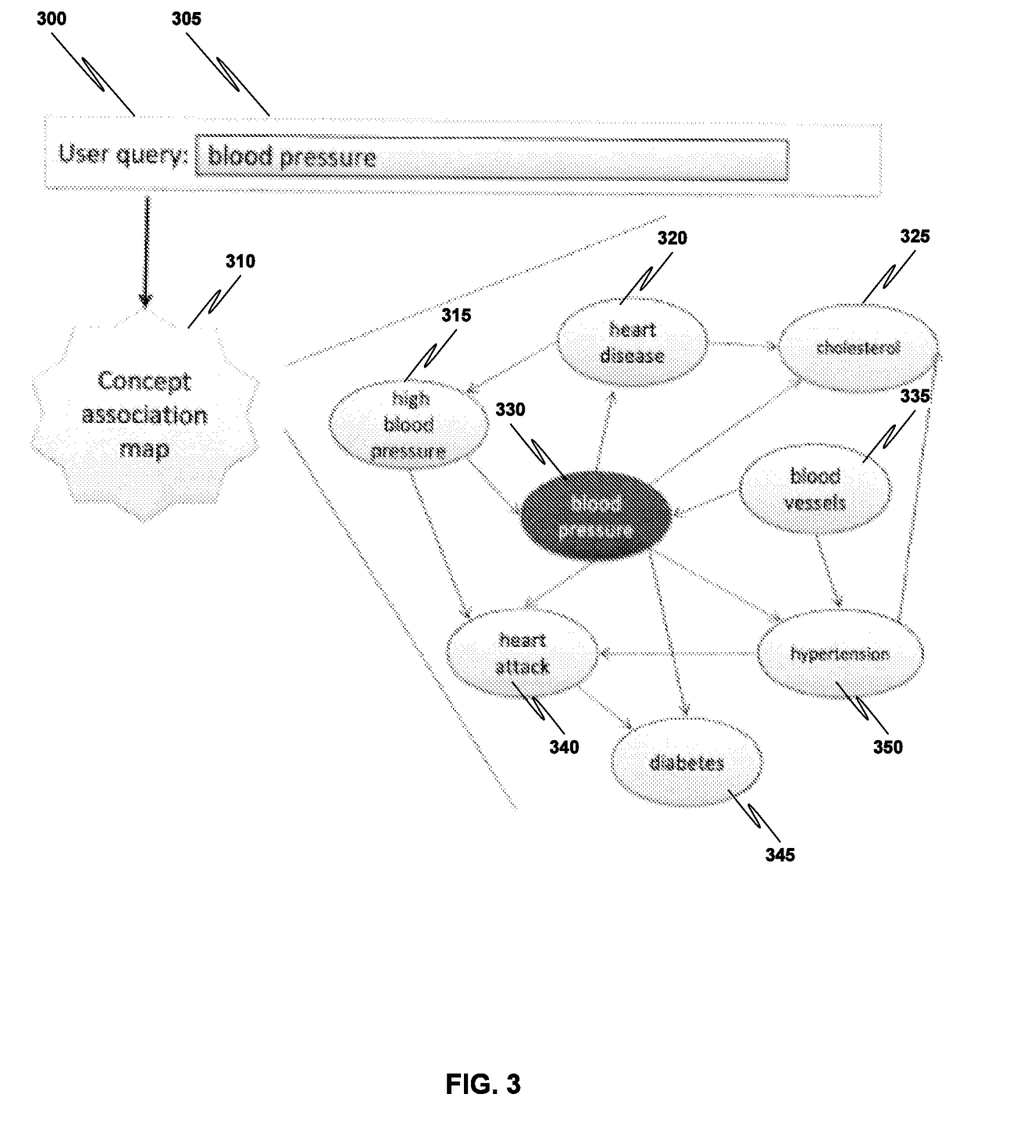
FIG. 3 is a block diagram that illustrates conceptual expansion of seed nodes onto a concept map in accordance with one embodiment of the present invention.

FIG. 3 is a block diagram that illustrates conceptual expansion of seed nodes onto a concept map in accordance with one embodiment of the present invention. In FIG. 3, the user has entered "blood pressure." "Blood pressure" is found in concept association map 310 and is thus a seed concept. As shown in the blown-up portion of concept association map 310, the neighbors of the "blood pressure" concept 330 are "high blood pressure" 315, "heart disease" 320, "cholesterol" 325, "blood vessels" 335, "hypertension" 350, "diabetes" 345, and "heart attack" 340.

One cost function is based on selecting the neighbors that present the best clustering characteristics, i.e. they are more likely to be strongly associated with each other.

Another cost function is based on selecting neighbors that, based on aggregate user activity history, have a higher likelihood to be associated.

Another cost function is based on looking at the likelihood that such concepts are selected together based on their co-occurrence in a corpus of documents (e.g. the World Wide Web).

Another cost function is based on determining which neighboring concepts in the concept association map are tied to a form of monetization (e.g. online advertisement) that yields the highest conversion rate (measured as a combination of CPC and CTR).

According to one embodiment of the present invention, the nodes in the concept association map are also tagged with labels representing one or more high-level categories.

According to one embodiment of the present invention, a page content classifier 120 is utilized to label the page with a high level category in order to narrow down the mapping to the concept association map 130 to certain pre-defined contexts.

According to one embodiment of the present invention, results on the concept association map 130 are clustered to identify different user's intention.

According to another embodiment of the present invention, the highest-weighted concepts in the graph are chosen as top related concepts. Weight score can be defined using different sources. Examples of weights to be used are structural scores like "betweenness" and "page rank," monetization values like click through and cost per click and frequency of appearance on the web or user's query logs.

Figure 4:
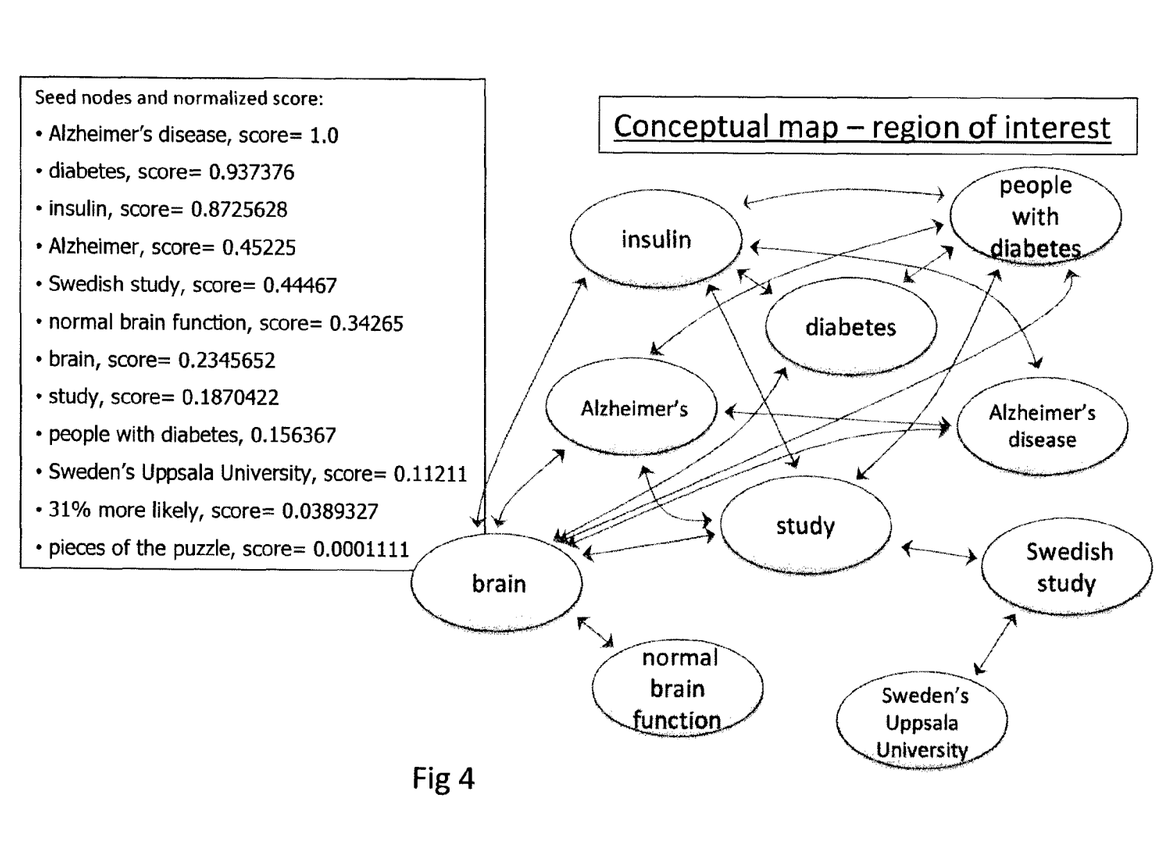
FIG. 4 is a block diagram that illustrates an example of a region of interest in concept space for a particular input page in accordance with one embodiment of the present invention.

FIG. 4 is a block diagram that illustrates an example of a region of interest in concept space for a particular input page in accordance with one embodiment of the present invention. The concept association map is augmented by adding links between search queries and concepts on the concept association map through the pages that received these referrals. For example, if page a.b.c.com/d receives a large volume of search traffic for the term "diabetes diagnostic" and the page is mapped to region of interest with top concepts: "diabetes disease," "diabetes symptoms," and "type 2 diabetes," the weight of the link between these concepts and "diabetes diagnostic" is increased.

Figure 5:
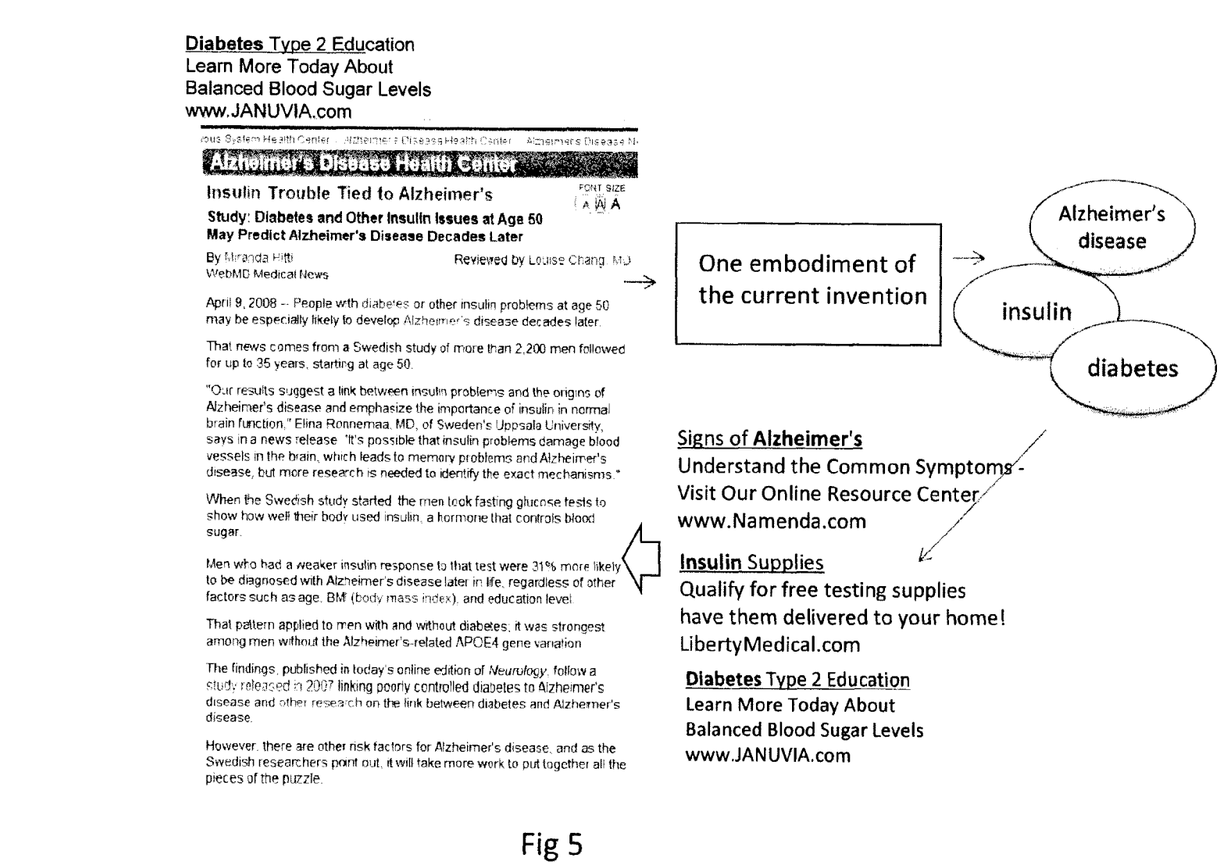
FIG. 5 is a block diagram that illustrates matching pay per click (PPC) advertisements to web pages in accordance with one embodiment of the present invention.

According to another embodiment of the present invention, top concepts and regions of interest are used to map paid listings or other forms of advertisement to the content node as described in FIG. 5. FIG. 5 is a block diagram that illustrates matching pay per click (PPC) advertisements to web pages in accordance with one embodiment of the present invention. In FIG. 5, a web page displaying a document entitled "Insulin Trouble Tied to Alzheimer's" is shown on the left, and three paid listings are shown on the right. The document and the paid listings are considered content nodes. The top concepts identified in the document are "Alzheimer's disease," "insulin," and "diabetes." The particular three paid listings are selected based on how closely the listings are identified with the same top concepts identified in the document. The paid listing "Signs of Alzheimer's" is identified with the concept "Alzheimer's disease." The paid listing "Insulin Supplies" is identified with the concept "insulin." The paid listing "Diabetes Type 2 Education" is identified with the concept "diabetes." The effectiveness of the paid listings is increased by placing the listings near the document identified with the same concepts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
extracting a set of concepts from a first web page;
expanding the set of extracted concepts by identifying neighbor concepts related to the context of the extracted concepts in at least one web page other than the first web page;
generating a concept map for the first web page comprising the expanded set of extracted concepts as nodes in the concept map and links between the nodes in the concept map indicating relationships among the expanded set of extracted concepts;
receiving a set of ad concepts for an advertisement;
expanding the set of ad concepts by identifying neighbor concepts in at least one web page that are related to the context of the ad concepts;
receiving a request from a web browser of a user device for the first web page;
determining that at least one concept of the set of expanded ad concepts corresponds to at least one concept of the expanded set of extracted concepts of the first web page; and
in response, displaying the advertisement proximate the first webpage.

2. The method of claim 1, wherein the identifying the neighbor nodes is based at least in part on one or more statistical measures, wherein the one or more statistical measures comprises one or more of:
an indication of a likelihood that a given n-gram will appear in a document that is part of a corpus;
a frequency of n-grams in the web page;
a similarity of the web page to other web pages for which relevant concept candidates have already been identified; and
a weight of the web page in the concept map.

3. The method of claim 1, further comprising opening a second web page via the web browser, the second web page comprising a plurality of different predefined content sections, wherein concept candidates to be added to the concept map are identified from the plurality of different predefined content sections.

4. The method of claim 1, wherein the concept map is derived from one or more of:
concept relationships found on the World Wide Web;
associations derived from user browsing history;
advertisers bidding campaigns;
taxonomies; and
encyclopedias.

5. The method of claim 1, wherein identifying neighbor nodes further comprises determining concepts that are more likely to be strongly associated with each other based on one or more cost functions and increasing the weight of the link with the selected neighbor nodes.

6. The method of claim 5, wherein the one or more cost functions comprises selecting neighbor nodes that, based on aggregate user activity history, have a higher likelihood to be associated.

7. The method of claim 5, wherein the one or more cost functions comprises determining which neighboring concepts in the concept map are tied to a form of monetization that yields a highest conversion rate.

8. An apparatus comprising:
a memory; and
a processor coupled to the memory and configured to:
extract a set of concepts from a first webpage;
expanding the set of extracted concepts by identifying neighbor concepts related to the context of the extracted concepts in at least one web page other than the first web page;
generate a concept map of the first webpage comprising the expanded set of extracted concepts as nodes in the concept map and links between the nodes indicating relationships among the extracted concepts;
receiving a set of ad concepts for an advertisement;
expanding the set of ad concepts by identifying neighbor concepts in at least one web page related to the context of the ad concepts;
a request from a web browser of a user device for the first web page
determining that at least one concept of the set of expanded ad concepts corresponds to at least one concept of the expanded set of extracted concepts of the first web page; and
in response, displaying the advertisement proximate the first webpage on the user device.

9. The apparatus of claim 8, wherein the processor identifies the neighbor concepts based at least in part on one or more statistical measures, wherein the one or more statistical measures comprises one or more of:
an indication of a likelihood that a given n-gram will appear in a document that is part of a corpus;
a frequency of n-grams in the web page;
a similarity of the web page to other web pages for which relevant concept candidates have already been identified; and
a weight of the web page in the concept map.

10. The apparatus of claim 8, wherein the processor is further configured to open a second web page via the web browser, the second web page comprising a plurality of different predefined content sections, wherein concept candidates to be added to the concept map are identified from the plurality of different predefined content sections.

11. The apparatus of claim 8, wherein the concept map is derived from one or more of:
concept relationships found on the World Wide Web;
associations derived from user browsing history;
advertisers bid campaigns;
taxonomies; and
encyclopedias.

12. The apparatus of claim 8, wherein the processor is further configured to perform one or more of:
select neighbor nodes that are more likely to be strongly associated with each other,
select neighbor nodes that, based on aggregate user activity history, have a higher likelihood to be associated; and
determine which neighbor concepts in the concept map are tied to a form of monetization that yields a highest conversion rate.

* * * * *